United States Patent
Seo et al.

(10) Patent No.: US 10,180,831 B2
(45) Date of Patent: *Jan. 15, 2019

(54) TERMINAL DEVICE FOR DOWNLOADING AND INSTALLING AN APPLICATION AND METHOD THEREOF

(71) Applicant: Samsung Electronics Co., Ltd., Gyeonggi-do (KR)

(72) Inventors: Joon-kyu Seo, Gyeonggi-do (KR); Hyun-jin Kim, Seoul (KR); Ji-yeon Kwak, Seoul (KR); Jin Ra, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/184,084

(22) Filed: Feb. 19, 2014

(65) Prior Publication Data

US 2014/0196026 A1    Jul. 10, 2014

Related U.S. Application Data

(63) Continuation of application No. 13/237,490, filed on Sep. 20, 2011.

(30) Foreign Application Priority Data

Sep. 20, 2010 (KR) .................. 10-2010-0092521

(51) Int. Cl.
*G06F 17/00* (2006.01)
*G06F 8/61* (2018.01)
(Continued)

(52) U.S. Cl.
CPC ............... *G06F 8/61* (2013.01); *H04N 5/445* (2013.01); *H04N 5/44591* (2013.01);
(Continued)

(58) Field of Classification Search
CPC ....................... H04N 21/2368; H04N 21/4307
(Continued)

(56) References Cited

U.S. PATENT DOCUMENTS 5,634,128 A * 5/1997 Messina ........................ 719/316
7,363,035 B2    4/2008 Reilly
(Continued)

FOREIGN PATENT DOCUMENTS

CN    101308443    11/2008
EP    1 868 069    12/2007
(Continued)

OTHER PUBLICATIONS

Brian Burgess, 'Disable Highlighting New Programs in Windows 7, XP, Vista', Oct. 28, 2009, how-to geek, pp. 1-5.*
(Continued)

*Primary Examiner* — Stephen S Hong
*Assistant Examiner* — Matthew J Ludwig
(74) *Attorney, Agent, or Firm* — The Farrell Law Firm, P.C.

(57) ABSTRACT

An application installation method of a mobile device is provided. The method includes installing an application on the mobile device; presenting, if the application is installed, an icon corresponding to the application and a mark to indicate that the application is installed, such that at least a portion of the mark is located on the icon; executing the application; and presenting, after the application is executed, the icon without the mark.

13 Claims, 11 Drawing Sheets

(51) Int. Cl.
*H04N 5/445* (2011.01)
*H04N 9/82* (2006.01)
*H04N 21/414* (2011.01)
*H04N 21/431* (2011.01)
*H04N 21/472* (2011.01)
*H04N 21/488* (2011.01)
*H04N 21/81* (2011.01)
*G06F 9/451* (2018.01)

(52) U.S. Cl.
CPC ..... *H04N 9/8205* (2013.01); *H04N 21/41407* (2013.01); *H04N 21/4312* (2013.01); *H04N 21/472* (2013.01); *H04N 21/4882* (2013.01); *H04N 21/8166* (2013.01); *G06F 9/451* (2018.02)

(58) Field of Classification Search
USPC .................. 715/201, 203, 204, 208; 717/178
See application file for complete search history.

(56) References Cited

U.S. PATENT DOCUMENTS

| | | | |
|---|---|---|---|
| 7,873,468 B2 | 1/2011 | Matsuura et al. | |
| 8,255,828 B2 | 8/2012 | Harris et al. | |
| 8,302,014 B2* | 10/2012 | Lezama Guadarrama et al. | 715/744 |
| 8,359,016 B2 | 1/2013 | Lindeman et al. | |
| 8,428,564 B2 | 4/2013 | Reilly | |
| 8,600,444 B2 | 12/2013 | Jeong et al. | |
| 8,627,222 B2* | 1/2014 | Hartwell et al. | 715/764 |
| 8,689,123 B2* | 4/2014 | Zaman | G06Q 10/107 715/767 |
| 8,689,137 B2* | 4/2014 | McCormack et al. | 715/810 |
| 8,725,790 B2* | 5/2014 | Sheshadri | G06Q 30/0603 705/40 |
| 8,726,192 B2 | 5/2014 | Matsushima et al. | |
| 8,972,896 B2 | 3/2015 | Matsushima et al. | |
| 8,977,985 B2 | 3/2015 | Matsushima et al. | |
| 9,223,477 B2 | 12/2015 | Harris et al. | |
| 9,495,089 B2 | 11/2016 | Jeong et al. | |
| 9,772,751 B2* | 9/2017 | Anzures | G06F 3/0483 |
| 9,817,545 B2* | 11/2017 | Cranfill | G06F 3/04817 |
| 9,841,874 B2* | 12/2017 | Gu | G06F 3/0482 |
| 2002/0007391 A1 | 1/2002 | Suzuki | |
| 2004/0109013 A1 | 6/2004 | Goertz | |
| 2004/0192440 A1 | 9/2004 | Evans et al. | |
| 2005/0154798 A1 | 7/2005 | Nurmi | |
| 2006/0014523 A1 | 1/2006 | Reilly | |
| 2006/0020904 A1 | 1/2006 | Aaltonen et al. | |
| 2006/0036965 A1 | 2/2006 | Harris et al. | |
| 2006/0129636 A1 | 6/2006 | Matsuura et al. | |
| 2007/0013790 A1 | 1/2007 | Nakase | |
| 2007/0025311 A1 | 2/2007 | Jeong et al. | |
| 2008/0153468 A1 | 6/2008 | Reilly | |
| 2008/0184112 A1 | 7/2008 | Chiang et al. | |
| 2009/0064055 A1 | 3/2009 | Chaudhri et al. | |
| 2009/0305732 A1 | 12/2009 | Marcellino et al. | |
| 2010/0083181 A1 | 4/2010 | Matsushima et al. | |
| 2010/0107150 A1* | 4/2010 | Kamada | G06F 8/65 717/170 |
| 2010/0162160 A1 | 6/2010 | Stallings et al. | |
| 2010/0223563 A1 | 9/2010 | Green | |
| 2012/0289147 A1 | 11/2012 | Raleigh et al. | |
| 2012/0324394 A1 | 12/2012 | Harris et al. | |
| 2013/0060489 A1 | 3/2013 | Crossman et al. | |
| 2014/0082556 A1 | 3/2014 | Matsushima et al. | |
| 2014/0089844 A1 | 3/2014 | Jeong et al. | |
| 2014/0317571 A1 | 10/2014 | Matsushima et al. | |
| 2015/0141146 A1 | 5/2015 | Matsushima et al. | |
| 2016/0117069 A1 | 4/2016 | Harris et al. | |
| 2016/0357369 A1 | 12/2016 | Matsushima et al. | |

FOREIGN PATENT DOCUMENTS

| | | |
|---|---|---|
| EP | 1 956 472 | 8/2008 |
| JP | 2003-223325 | 8/2003 |
| JP | 2005-517244 | 6/2005 |
| JP | 2006-155558 | 6/2006 |
| JP | 2006-268160 | 10/2006 |
| JP | 2007-042105 | 2/2007 |
| JP | 2007-293460 | 11/2007 |
| JP | 2009-500761 | 1/2009 |
| JP | 2010-086327 | 4/2010 |
| KR | 1020030068310 | 8/2003 |
| KR | 1020040001358 | 1/2004 |
| KR | 100677377 | 1/2007 |
| RU | 2005-125837 | 2/2007 |
| WO | WO 2008/114491 | 9/2008 |

OTHER PUBLICATIONS

Microsoft Community, 'New Program is highlighted in yellow', Posted Feb. 14, 2010, answers.microsoft.com.*
Mexican Office Action dated Apr. 28, 2014 issued in counterpart Application No. MX/a/2014/000330.
Mexican Office Action dated Sep. 26, 2014 issued in counterpart Application No. MX/a/2014/000330.
Australian Examination Report dated Oct. 10, 2014 issued in counterpart Application No. 2011306546.
Chinese Office Action dated Jul. 2, 2015 issued in counterpart Application No. 201180045164.0, 13 pages.
Mexican Office Action dated Jul. 15, 2015 issued in counterpart Application No. MX/a/2014/000330, 7 pages.
Korean Office Action dated Jul. 18, 2016 issued in counterpart Application No. 10-2010-0092521, 7 pages.
Australian Examination Report dated Jun. 28, 2016 issued in counterpart Application No. 2015202312, 2 pages.
Russian Office Action dated Feb. 19, 2016 issued in counterpart Application No. 2013118010, 8 pages.
Australian Examination Report dated Mar. 11, 2016 issued in counterpart Application No. 2015202312, 3 pages.
Japanese Office Action dated Apr. 18, 2016 issued in counterpart Application No. 2013-529080, 5 pages.
Decision on Grant dated Oct. 11, 2016 issued in counterpart Application No, 2013118010/08, 13 pages.
Japanese Office Action dated Jun. 5, 2017 issued in counterpart application No. 2016-160463, 8 pages.
Japanese Office Action dated Mar. 6, 2017 issued in counterpart application No. 2013-529080, 5 pages.
Korean Office Action dated Apr. 6, 2017 issued in counterpart application No. 10-2010-0092521, 11 pages.
Japanese Office Action dated Oct. 2, 2017 issued in counterpart application No. 2016-160463, 9 pages.
European Search Report dated May 18, 2018 issued in counterpart application No. 14168227.8-1224, 4 pages.
Mexican Office Action dated Aug. 22, 2013 issued in counterpart Application No. MX/a/2013/003198.
IPhone User Guide, 'For IPhone OS 3.1 Software', Apple, Inc., 2009, pp. 1-217.
Bakari Chavanu, '4 Great Tips to Organize Apps on the iPhone iOS4', makeuseof.com, Jun. 28, 2010.
Mexican Office Action dated Feb. 23, 2015 issued in counterpart Application No. MX/a/2014/000330.
Japanese Office Action dated Oct. 5, 2015 issued in counterpart Application No. 2013-529080, 7 pages.
Mexican Office Action dated Nov. 27, 2015 Issued in counterpart Application No. MX/a/2014/000330, 10 pages.

* cited by examiner

TERMINAL DEVICE FOR DOWNLOADING AND INSTALLING AN APPLICATION AND METHOD THEREOF

PRIORITY

This application is a Continuation of U.S. application Ser. No. 13/237,490, which was filed in the U.S. Patent and Trademark Office on Sep. 20, 2011, and claims priority under 35 U.S.C. § 119(a) to Korean Patent Application No. 10-2010-0092521, which was filed on Sep. 20, 2010, in the Korean Intellectual Property Office, the entire content of each which is incorporated herein by reference.

BACKGROUND OF THE INVENTION

1. Field of the Invention

The present invention relates generally to installing an application, and more particularly to a terminal device which downloads and installs an application from an external server, while indicating an identifier corresponding to the application at an adequate location, and a method thereof.

2. Description of the Related Art

Terminal devices such as smartphones provide a variety of functionality, through various forms of application programs to thus provide convenience to users. The application programs may be installed as default applications by the manufacturers of the devices, or by users, after purchasing the device, by downloading applications from external servers.

The application market has expanded to services that enable downloading of applications to not only portable terminal devices, but also stationary terminal devices such as Televisions (TVs).

Once an application program is installed, an identifier that represents the corresponding application program may appear on the background screen, such as icons corresponding to applications displayed on the background screens of smartphones.

Since the icons are displayed at random locations, users have to search through pages to find the location of an icon they have just installed and as the number of installed applications increases, newly-installed icons that have not been used yet become more difficult to distinguish at a glance.

SUMMARY OF THE INVENTION

Accordingly, the present invention has been made to solve the above-mentioned disadvantages occurring in the prior art and other related disadvantages not described above, and the present invention provides a terminal device which, when an application is downloaded and installed, distinguishes the application by setting the location and shape of an identifier corresponding to a downloaded application to thus enable convenient use of the application by a user, and a method for installing the application.

According to an aspect of the present invention, an application installation method of a mobile device is provided. The method includes installing an application on the mobile device; presenting, if the application is installed, an icon corresponding to the application and a mark to indicate that the application is installed, such that at least a portion of the mark is located on the icon; executing the application; and presenting, after the application is executed, the icon without the mark.

According to another aspect of the present invention, a mobile device is provided. The mobile device includes a communication interface configured to download an application; a storage configured to store the downloaded application; a user interface configured to present, if the application is installed on the mobile device, an icon corresponding to the application and a mark to indicate that the application is installed, such that at least a portion of the mark is located on the icon; and a controller configured to control, after the application is executed, the user interface to present the icon without the mark.

According to another aspect of the present invention, a non-transitory computer readable medium where a program to execute a method to install an application on a mobile device is stored is provided. The method includes installing an application on the mobile device; presenting, in response to the application is installed, an icon corresponding to the application and a mark to indicate that the application is installed, such that at least a portion of the mark is located on the icon; executing the application; and presenting, in response to the application is executed, the icon without the mark.

BRIEF DESCRIPTION OF THE DRAWINGS

The above and other features, aspects and advantages of the present invention will be more apparent from the following detailed description taken in conjunction with the accompanying drawings, in which.

DETAILED DESCRIPTION OF EMBODIMENTS OF THE PRESENT INVENTION

Figure 1:
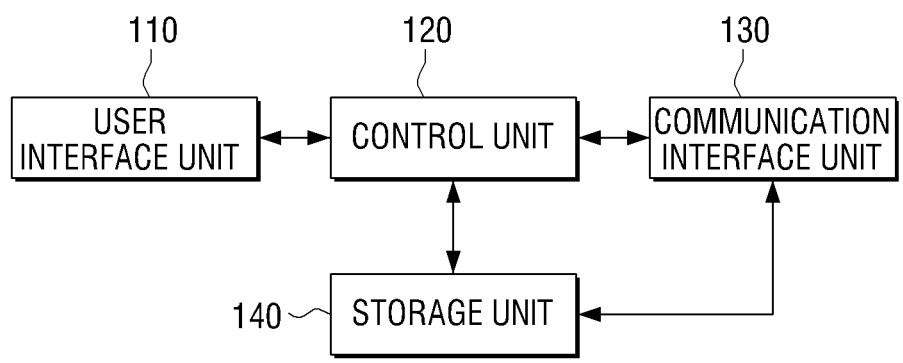
FIG. 1 is block diagram of a terminal device according to an embodiment of the present invention.

Hereinafter, various embodiments of the present invention will be described in greater detail with reference to the accompanying drawings, in which aspects of the present invention are illustrated.

In the following description, same drawing reference numerals are used for the same elements throughout the drawings. While the embodiments are described with detailed construction and elements, to assist in a comprehensive understanding of the present invention, the embodiments of the present invention can be implemented without those specific details. Also, well-known functions or constructions may be omitted so as to avoid obscuring the description with unnecessary detail.

FIG. 1 is a block diagram of a terminal device according to an embodiment of the present invention. The terminal device herein may be portable devices such as mobile phones, Personal Digital Assistants (PDAs), MP3 players, or stationary terminal devices such as TVs, electronic frames, electronic display devices, and the like Referring to FIG. 1, the terminal device may include a user interface unit 110, a control unit 120, a communication interface unit 130, and a storage unit 140.

The user interface unit 110 may be configured to display various screens providing a user with information, and receives various commands or data from the user. The user interface unit 110 may be implemented in a form that includes a separate display terminal (e.g., a Liquid Crystal Display (LCD) panel, etc.) and input device (e.g., button, wheel, touchpad, Infra-Red (IR) reception, etc.), or as a touch screen that is capable of both output and input.

The storage unit 140 stores various programs installed on the terminal device. The storage unit 140 may include one or more various memories such as, for example, a Read Only Memory (ROM), a Random Access Memory (RAM), a flash memory, a memory card, a Universal Serial Bus (USB) memory, a Hard Disk Drive (HDD), etc. Specifically, the storage unit 140 may store therein various programs such as, for example, an Operating System (O/S) program to drive the terminal device, various utility programs, various application programs, or viewer programs. For convenience of explanation, the programs used in the terminal device are collectively referred to as "applications."

The user may select an application intended for execution through the user interface unit 110. Specifically, the user may select the intended application by selecting an application identifier displayed on the screen of the terminal device. The identifier may be displayed in various forms. One example, is the identifier may be displayed in the form of an icon arranged on the background screen of the terminal, or in text form that represents the application. Further, the identifier may be directly formed on the screen of the terminal device, or appears on the screen when the user selects a specific button such as "menu" button to search available applications.

When an application is selected, the control unit 120 executes the application program stored in the storage unit 140 and provides the user with the service corresponding to the application program.

The applications may be installed upon manufacturing the terminal devices, or acquired from an external device (i.e., server) which is connected through wired or wireless interface, or downloaded from application stores that provide applications for sale.

The communication interface unit 130 is configured to be connected to the external server by wired or wireless communication protocol and download applications. The applications downloaded from the communication interface unit 130 may be stored at the storage unit 140.

The control unit 120 is connected to a server using the communication interface unit 130 in response to a server access command received from the user through the user interface unit 110. The information provided from the server is provided to the user through the user interface unit 110. The user may search, select and input a command to download an intended application. In response to an input of the download command, the control unit 120 transmits a download request for the selected application through the communication interface unit 130. Processes such as authentication and installation of security programs may be additionally implemented. If the application is sent from the server, the control unit 120 stores the received application at the storage unit 140 and installs the application.

If a command to download the application is input, the control unit 120 selects the page to display an identifier corresponding to the application. That is, the control unit 120 controls the user interface unit 110 to display the page select screen.

The user may select a page to add the identifier from the page select screen displayed on the user interface unit 110.

If the page is selected, the control unit 120 controls the user interface unit 110 so that the identifier is displayed on the selected page during or after downloading.

As explained above, the identifier may be implemented in various forms including icons or text. Further, the page select screen may be implemented in various forms.

Figure 2:
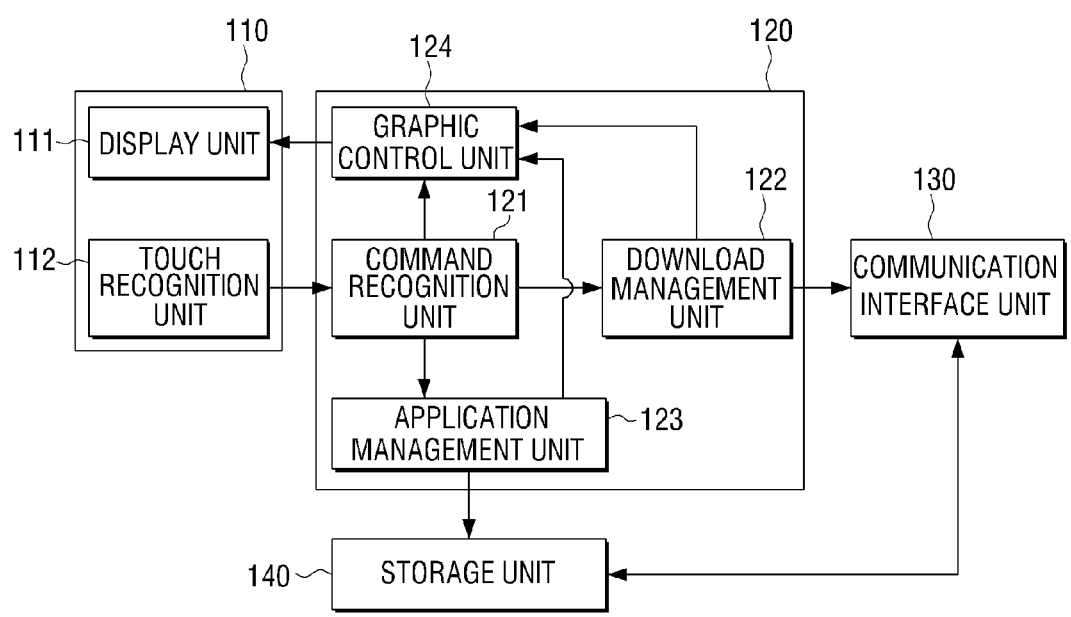
FIG. 2 is a block diagram of a terminal device according to an embodiment of the present invention.

FIG. 2 is a detailed block diagram of a terminal device according to an embodiment of the present invention. Referring to FIG. 2, the terminal device may include a user interface unit 110, a control unit 120, a communication interface unit 130, and a storage unit 140.

For example, the user interface unit 110 may be implemented as a touch screen. That is, the user interface unit 110 may include a display unit 111, and a touch recognition unit 112. The display unit 111 may be composed of a plurality of layers such as display panel, color filter, or backlight unit. The display unit 111 display various screens according to the data provided from the control unit 120.

The touch recognition unit 112 may be implemented as a touch sensor provided on the display unit 111 to perceive a touch of the user on the display panel. The touch recognition unit 112 may provide the control unit 120 with information about a spot touched on by the user, such as coordinate information.

The control unit 120 includes a command recognition unit 121, a download management unit 122, an application management unit 123, and a graphic control unit 124.

The command recognition unit 121 recognizes the command input by the user based on the information provided from the touch recognition unit 112 and the currently-displayed screen data. The command recognition unit 121 may control the download management unit 122, the application management unit 123 and the graphic control unit 124 according to the recognized command.

The download management unit 122 accesses the server via the communication interface unit 130 and provides the function of downloading an application. The download management unit 122 generates a command or data for various functions such as server access, search, application selection, or download requests, transmits these to the server via the communication interface unit 130 and performs the download according to a response from the server.

The application management unit 123 is configured to manage various applications stored and installed at the storage unit 140. The application management unit 123 may read the application selected by the user from the storage unit 140 and execute the read application. Further, the application management unit 123 manages a use history of each application based on the use thereof. That is, the application management unit 123 may mange the history of each application by frequency or time of use. Further, the application management unit 123 may also manage the location at which the respective application is installed. The application management unit 123 may manage information including an address of a location at which an application is stored in the storage unit 140, a location of an application identifier on the screen page, a number of identifiers per page, and the like.

The graphic control unit 124 generates screen data to be displayed at the display unit 111 and provides the generated data to the display unit 111. The graphic control unit 124 generates data for various screens related with application download such as, for example, page select screens in various forms, thumbnail images with respect to the pages, screens corresponding to the data transmitted from the server, and the like., and outputs the generated data to the display unit 111. Additionally, the graphic control unit 124 may render a screen according to execution of an application and provide the display unit 111 with the rendered screen.

Figure 3:
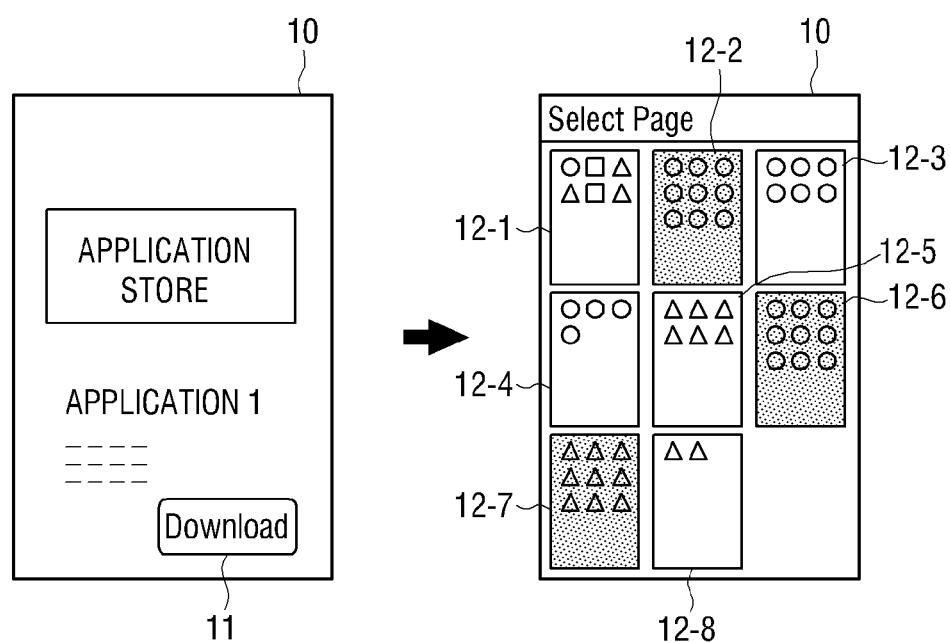
FIG. 3 is a diagram illustrating an example of a page select screen, displayed at downloading of an application according to an embodiment of the present invention.

FIG. 3 is a diagram illustrating an example of a page select screen which is displayed when downloading an application according to an embodiment of the present invention.

Referring to FIG. 3, in response to a download command 11 on the screen 10 provided by the server, the screen 10 becomes a page select screen. On the page select screen, the screen pages of the terminal device may each be represented by a thumbnail image and aligned.

That is, the identifiers of the applications may be aligned on the background screen of the terminal device. Herein, if there are too many identifiers to be displayed on one screen, the excess identifiers may be aligned on the next page. The user may turn to the next page by touching on the screen or manipulating the key. As explained above, in an example where the identifiers are represented in icon forms, the icons may be displayed on the respective pages. Accordingly, different number and type of identifiers appear on each page.

FIG. 3 illustrates thumbnail images of pages being displayed on a screen 10 according to an embodiment of the present invention. Referring to FIG. 3, total eight thumbnail images (12-1~12-8) may be displayed. In the example illustrated in FIG. 3, pages 1, 3, 4, 5, 8 (12-1, 12-3, 12-4, 12-5, 12-8) have space to add identifiers and thus can be displayed as selectable state. Conversely, pages 2, 6, and 7 (12-2, 12-6, 12-7) have no space to add the identifiers and thus displayed as non-selectable state. Accordingly, the user can be guided to select the page from among the pages that can add identifiers therein.

The selectable and non-selectable state may be displayed in various manners. For example, the thumbnail images in selectable state may be normally displayed, while the non-selectable thumbnail images may be blurred with downgraded brightness. Alternatively, non-selectable state of the thumbnail images may be represented by a corresponding message, or in distinguishing color from that of the selectable thumbnail images so that the user can notice the same.

Although all pages display thumbnail images and the thumbnails are indicated as selectable or non-selectable, depending on the presence and absence of spaces in FIG. 3, alternatively the thumbnail images with respect to the non-selectable pages may instead not be displayed.

Figure 4:
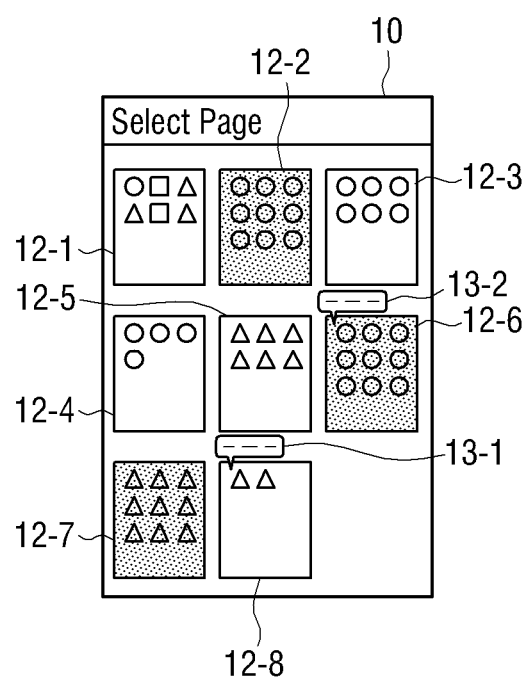
FIG. 4 is a diagram illustrating another example of the page select screen according to an embodiment of the present invention.

FIG. 4 is a diagram illustrating another construction of the page select screen according to an embodiment of the present invention. Referring to FIG. 4, identifiers are displayed in icon forms, and thumbnail images with respect to the respective pages in which existing identifiers are displayed, are aligned on one screen. As illustrated in FIG. 3, the thumbnail images with space are indicated to be selectable, while the thumbnail images without space are indicated to be non-selectable.

In each page, the identifiers may be grouped and stored under folders. Accordingly, when the user selects a page, a folder-selecting popup window may appear to allow the user to select a folder from the selected page.

Referring to FIG. 4, if a thumbnail image 8 (12-8) is selected, a folder-selecting popup window 13-1 is displayed at one side of the thumbnail image 8 (12-8). The folder-selecting popup window 13-1 displays all the folders included in the thumbnail image 8 (12-8) to thus allow the user to select a specific folder therefrom. In one embodiment, the information about the folders may be displayed on the folder-selecting popup window 13-1. Alternatively, a folder-selecting popup window may be displayed for each of the entire folders included in the thumbnail image 8 (12-8). Herein, the respective folder-selecting popup windows may display information about the identifiers included in the folder.

Even the page without space may have a folder therein, and if so, an identifier may be added to such folder. Accordingly, as illustrated in FIG. 4, if the thumbnail image 6 (12-6) from among the non-selectable thumbnail images 12-2, 12-6, 12-7 has a selectable folder therein, the folder-selecting window 13-2 may be fixedly indicated on one side of the thumbnail image 6 (12-6). The folder-selecting window 13-2 may also be displayed as a single window to indicate the information about the entire folder, or a plurality of windows corresponding to the respective folders to indicate identifier information under the corresponding folder.

Although the folder-selecting popup window 13-1 is provided for the selectable thumbnail image, while the stationary folder-selecting window 13-2, instead of popup window, is provided for the non-selectable thumbnail image, in FIG. 4, even for the non-selectable thumbnail images, the folder-selecting window 13-2 may be implemented as a popup window which appears in response to selecting of a corresponding image. Likewise, a stationary folder-selecting window, instead of popup window, may be provided for the selectable thumbnail images.

The folder-selecting window displayed on the screen may be provided to be selected by the unit of folders of the application groups which are categorized by application types or user's selection. For example, if a game application is downloaded, the folder-selecting popup window 13-1 or folder-selecting window 13-2 with respect to the folder of game group appear s on the screen in popup or stationary manner.

The identifiers of the applications may be displayed as various icons. The shapes of the icons may be provided by the application provider, or directed generated or edited by the user.

Figure 5:
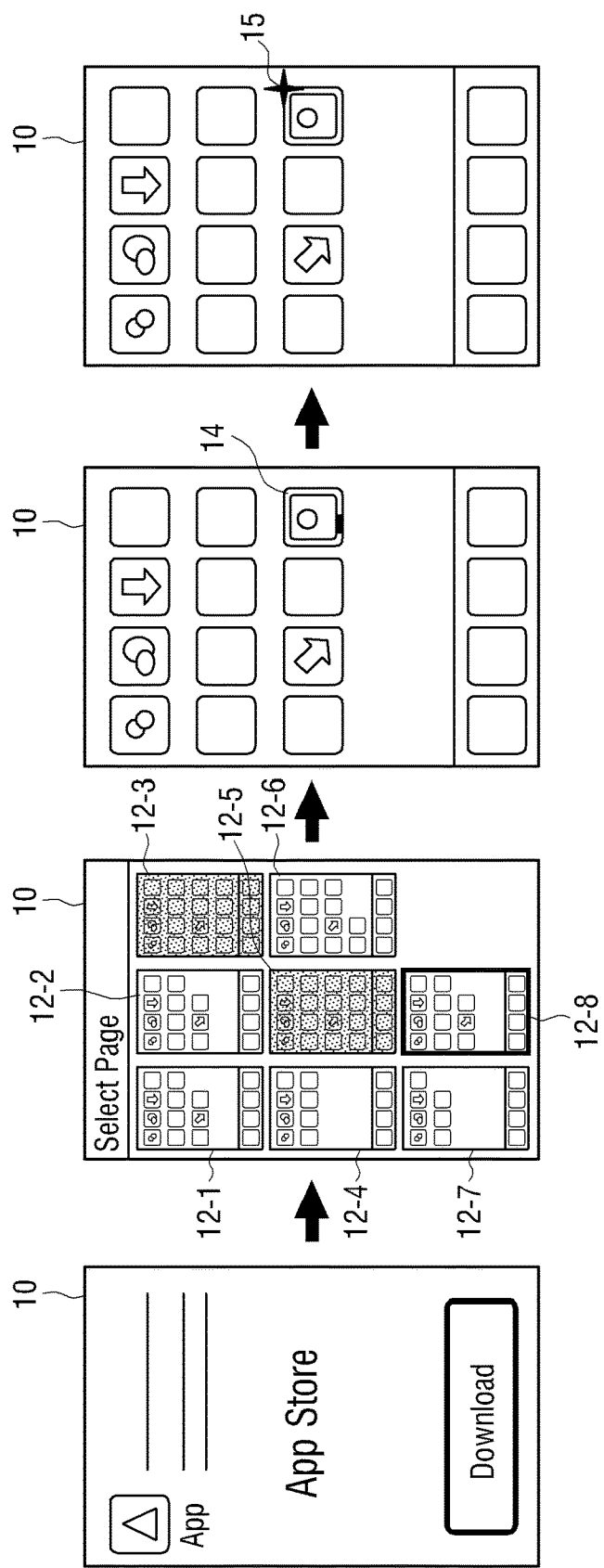
FIG. 5 is a diagram illustrating an example of application installation process according to an embodiment of the present invention.

FIG. 5 is a diagram provided to explain a process of downloading and installing an application according to an embodiment of the present invention. Referring to FIG. 5, in response to a download command input to a page provided from the application server, the screen 10 is turned to the page select screen. Accordingly, the thumbnail images 12-1~12-8 of the respective pages are displayed in selectable or non-selectable states.

If one thumbnail image is selected, the screen is turned to the page corresponding to the selected thumbnail image. For example, if thumbnail image 8 (12-8) is selected in FIG. 5, the icons displayed in the thumbnail image 8 (12-8) in reduced forms are arranged on the screen 10 in original sizes.

Thereafter, an icon corresponding to the newly-downloaded application is additionally displayed. On one side of the additional icon, information indicating the degree of processing download may be displayed. In FIG. 5, the progress bar 14 provides such information. That is, in FIG. 5, the progress bar 14 represents the degree of processing download by rotating along the edge of the icon in clockwise or counterclockwise direction.

Figure 6:
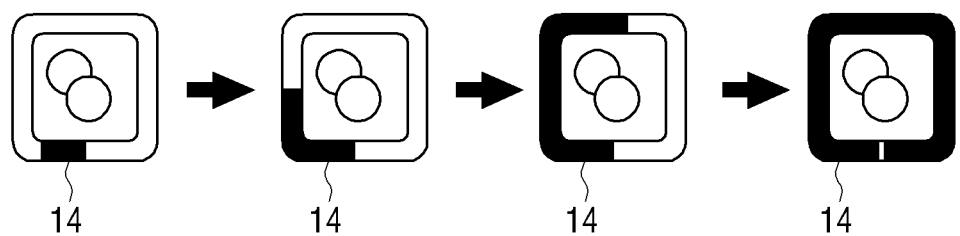
FIG. 6 is a diagram illustrating an example of progress bar displayed on an edge of an icon according to an embodiment of the present invention.
Figure 7:
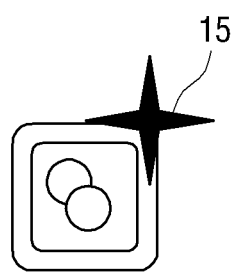
FIG. 7 is a diagram illustrating an example of an icon shape representing an application installed but not used yet according to an embodiment of the present invention.

The detailed form of the progress bar 14 is illustrated in FIGS. 6 and 7. Referring to FIG. 6, the progress bar 14 starts from a spot on one side of the icon, and extends in clockwise direction along the edge of the icon, and finishes at the spot where the progress bar 14 started as the download is completed.

As illustrated in FIG. 7, a mark 15 may be additionally displayed on one side of the icon to indicate that the download is completed.

That is, for an application which has been downloaded, but not used yet, the terminal device may indicate a specific form of mark on one side of the corresponding icon so that the user can easily notice such situation. Although the mark 15 is indicated in FIG. 5, other manners of marking may be implemented. For example, the icon itself may be flickered, or highlighted to draw user attention. Once the corresponding application is used, the terminal device may remove the mark 15.

In accordance with another embodiment, for applications that are less frequently used, an indicating mark may be used or a corresponding icon may be displayed to draw the attention of the user in a similar manner as explained above.

Although the progress bar is used in the embodiments of FIGS. 5 to 7 to indicate the degree of download progress, other forms of information such as numbers or text may also be used. For example, information such as percentage to represent the download progress, total time expected to be taken until completing download, time elapsed so far or remaining time may be indicated on a side of the icon or at a predetermined area on the screen. Further, the progress bar does not have to be displayed in the manner illustrated in FIG. 5 in which the progress bar surrounds the edge of the icon. For example, a simple bar may be displayed on one side of the icon.

While the identifiers may be displayed as icon forms in some embodiments, other examples are also possible. For example, text-based identifier may be used to represent an application. Specifically, text including detailed information such as name of the application, date of download, or name of the provider may be used as the identifier.

In the above-mentioned example, the identifiers may be arranged in a list form. Accordingly, the page select screen may be implemented in a form as illustrated in FIG. 8.

Figure 8:
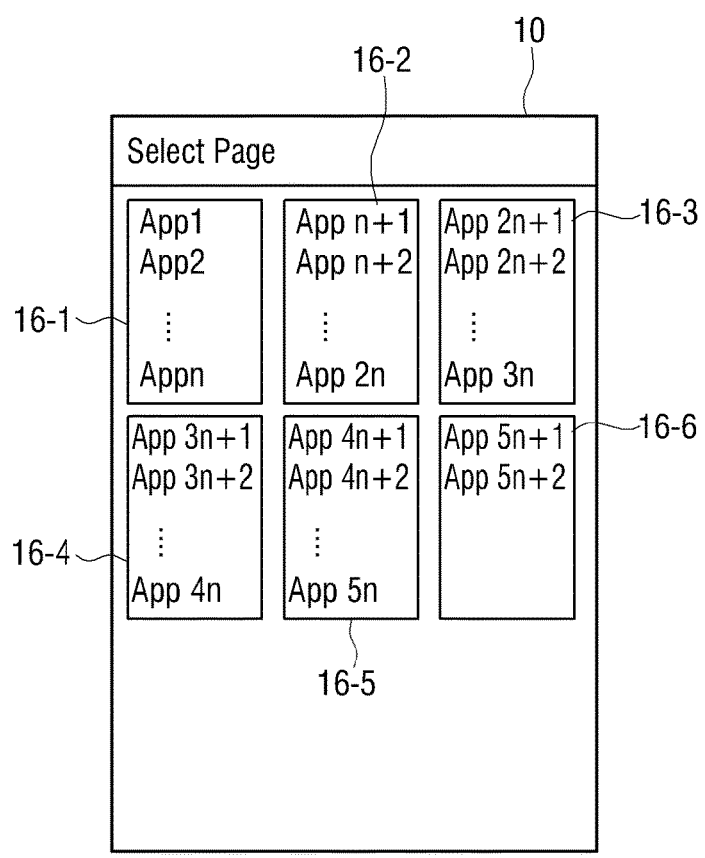
FIG. 8 is a diagram illustrating another example of the page select screen.

Referring to FIG. 8, a preset number of identifiers are formed on each page as a group, and thumbnail images (16-1 to 16-6) with respect to the respective pages may be displayed on the screen. The example of FIG. 8 has n number of identifiers on each page.

In such a state, the user may select a page to add an identifier of a newly-downloaded application. Herein, the user may select the page and also the location of the identifier on the corresponding page.

Unlike FIG. 3, FIG. 8 has all the pages in a selectable state. That is, the texts are listed in sequence, and since the pages simply divide the lists according to the preset number, the user may select the location to add the identifier from the list so that the identifier is displayed on the selected location. Accordingly, in the particular embodiment, the thumbnail images are not displayed in non-selectable state.

Figure 9:
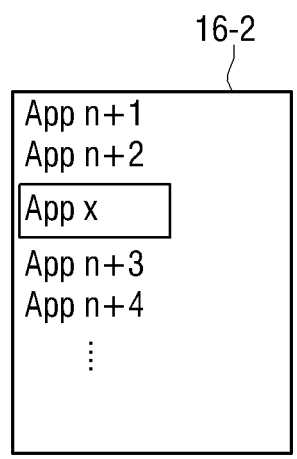
FIG. 9 is a diagram illustrating a process of adding a text corresponding to an application on a page that contains a text list according to an embodiment of the present invention.

FIG. 9 illustrates the construction of a screen on which one page is selected according to an embodiment of the present invention. That is, if the thumbnail image 2 (16-2) is selected from the screen of FIG. 8, the screen changes to the state as illustrated in FIG. 9. Accordingly, the user may select between App n+2 and App n+3 on the screen of FIG. 9.

In this example, the application text located below the selected location, i.e., APP n+3, APP n+4 . . . are shifted downward to thus ensure space, and new identifier (APP x) is additionally displayed on the ensured space.

As explained above, the identifier may be displayed not only as an icon, but also as a text, and in either case, it is possible to select the pages.

Further, in FIGS. 8 and 9, information to indicate the download progress may be displayed together. That is, numbers, text or progress bar to indicate the extent of completing download may be displayed on one side of the newly-added identifier (APP x).

Further, an identifier of the application which has been downloaded but not used yet may be displayed with brighter color or higher brightness, or flickered, or a marked with a specific mark. Since this has been explained in detail above with reference to FIGS. 5 to 7, detailed explanation and illustration thereof will be omitted for the sake of brevity.

Figure 10:
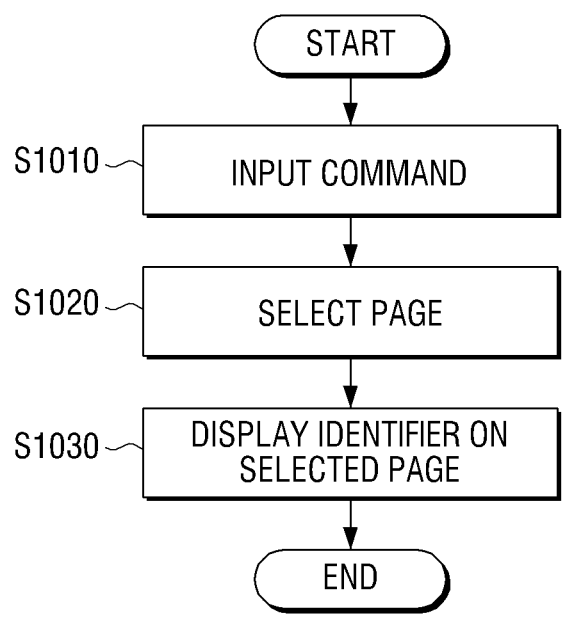
FIGS. 10 and 11 are flowcharts illustrating methods of a terminal device for installing an application according to embodiments of the present invention.

FIG. 10 is a flowchart illustrating a method for installing an application of a terminal device according to an embodiment of the present invention.

Referring to FIG. 10, at step S1010, if a command to download is input, at step S1020, a page select screen is provided and a page to display an identifier corresponding to a downloaded application is selected.

Page may be selected in various manners. Specifically, the user may select the page through the page select screen as the one illustrated in FIG. 3, 4, 5, or 8.

At step S1030, if a page is selected, an identifier is displayed on the selected page. As explained above, if the terminal device includes a touch screen, the page may be selected by direct touching on the screen.

Further, once the identifier is displayed, information to indicate the download progress may also be provided along with he identifier until download is completed.

Figure 11:
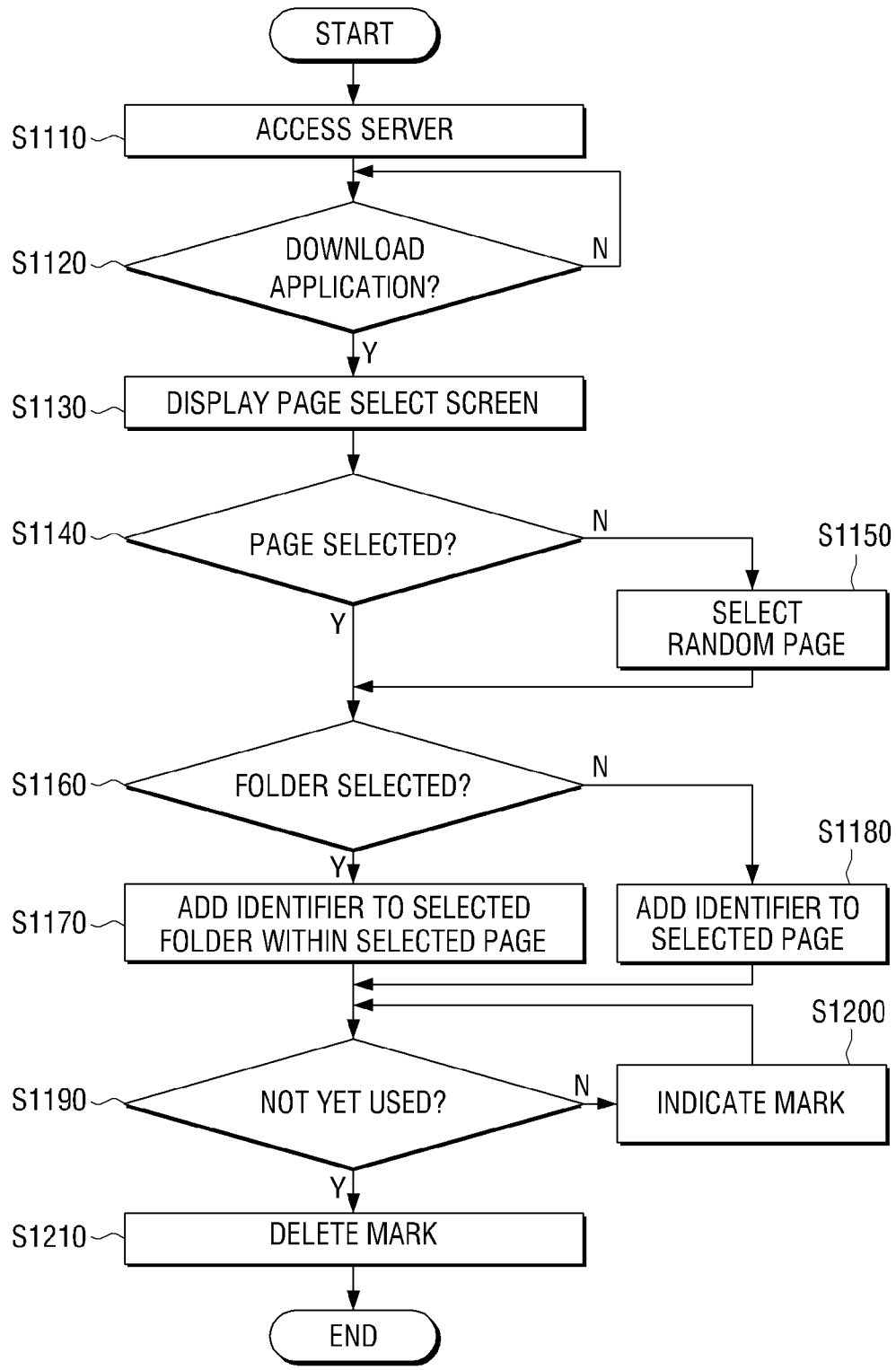

FIG. 11 is a flowchart illustrating a method for installing an application of a terminal device according to another embodiment of the present invention.

Referring to FIG. 11, at step S1110, the user accesses the server using the terminal device. Herein, the information regarding the server may be directly stored in the terminal device, or the user may directly input the server address and access the server.

After accessing the server, the user searches for the application to download and decides whether or not to download the application.

At step S1120, if the user selects an application to download and decides to download the selected application, at step S1130, the page select screen is displayed.

The page select screen may be constructed in a manner in which the respective pages including existing identifiers corresponding to the previously-installed applications are listed in thumbnail images. If there are too many thumbnail images to be displayed on one screen, the thumbnail images may be divided and displayed on a plurality of pages which are switchable by screen touch and scrolling.

At step S1140, if page is selected through the page select screen, at step S1160, the user may select the folder or group. That is, if page includes folder therein during page selection, a window for folder selection may appear. Accordingly, the user is enabled to select a specific folder through the displayed window. At step S1170, if the folder is selected, an identifier of the application to be downloaded under the corresponding folder of the corresponding page may be additionally displayed.

At step S1140, if the page is not selected, at step S1150, a page may be selected at random or the last page may be selected.

At step S1180, if the page is selected, but the folder is not selected, an identifier may be additionally displayed on the background screen of the selected page.

Apart from the operation to select the page and folder explained above, downloading and installing a selected application is automatically carried out.

As a result, on one side of the added identifier, information may be displayed, which is changed according to the download progress and installation. Accordingly, the user can check the download progress and installation of an application corresponding to the identifier.

At step S1190, if download and installation are completed, whether or not the application is used may be checked until the first use of the application, and at step S1200, if the application is not used, a mark may be displayed. The 'mark' herein may be implemented as an indicator that shows the application has not been used yet. Accordingly, the mark may be automatically displayed as the download is completed.

At step S1210, if the application indicated by the mark is used, the mark is deleted. After that, the identifier is treated as the existing identifiers.

Alternatively, step of selecting a folder, displaying or deleting a mark, and the like may be omitted. Further, folder may be selected directly without requiring page selection.

Further, the page select screen explained above may be selectively provided depending on modes. That is, if the user wishes to add a new identifier without directly selecting a page to display such new identifier, the user may set the operation to normal mode. In such an example, the page select screen is not provided, but the identifier may be directly displayed on a random page. Conversely, if the user wishes to directly select the page, the user may set the operation to page select mode. In this example, the user may select and display pages and folders through various forms of page select screens including those explained above.

Further, the method for installing an application according to various embodiments may be stored on various types of recording media and implemented by the program code which can be executed by a CPU provided in the terminal device body.

Specifically, the code to carry out the method for installing an application may be stored in various types of recording media which are readable by a terminal device, such as, for example, a RAM, a flash memory, a ROM, an Erasable Programmable ROM (EPROM), and Electronically Erasable and Programmable ROM (EEPROM), a register, a hard disk, a removable disk, a memory card, a USB memory, or a CD-ROM.

According to the above-described embodiments, the user is able to select an identifier corresponding to a new application and display the identifier at an intended location, and also easily determine the download progress or whether or not the application has been used. As a result, convenience of using applications improves.

While the present invention has been shown and described with reference to various embodiments thereof, the present teaching can be readily applied to other types of apparatuses. The description of the various embodiments of the present invention is intended to be illustrative, and changes in form and detail may be made without departing from the scope and spirit of the present invention, defined by the appended claims.

What is claimed is:

1. An application installation method of a mobile device, the method comprising:
   receiving an input to install an application;
   displaying a page selection screen to select one of a plurality of home screen pages;
   in response to receiving an input to select one of the plurality of home screen pages on the page selection screen, installing the application on the mobile device, and displaying an icon corresponding to the application and a graphic element for informing an installation progress of the application on the selected home screen page;
   in response to completing the installation of the application, removing the graphic element and displaying a mark on a side of the icon;
   in response to selecting the icon, executing the application and displaying an execution screen of the application; and
   in response to returning to the selected home screen page after executing the application, removing the mark displayed on the side of the icon.

2. The method of claim 1, wherein displaying the mark comprises displaying, from a time when the installation of the application is completed until a first time the application is executed, the mark on the side of the icon.

3. The method of claim 1, wherein displaying the mark comprises displaying, from a time when the installation of the application is completed until a first time the application is executed, the mark on the side of the icon as a flickering mark.

4. The method of claim 1, wherein displaying the mark comprises adding, from a time when the installation of the application is completed until a first time the application is executed, a highlight to the icon.

5. The method of claim 1, the method further comprising: downloading the application.

6. A mobile device, comprising:
   a communication interface configured to download an application;
   a storage configured to store the downloaded application;
   a user interface; and
   a controller configured to:
      receive an input to install an application through the user interface,
      control the user interface to display a page selection screen to select one of a plurality of home screen pages,
      in response to receiving an input to select one of the plurality of home screen pages on the page selection screen, download and install the application on the mobile device, control the user interface to display an icon corresponding to the application and a graphic element for informing an installation progress of the application on the selected home screen page,
      in response to receiving the installation of the application, control the user interface to remove the graphic element and display a mark on a side of the icon,
      in response to selecting the icon, executing the application and control the user interface to display an execution screen of the application; and in response to returning to the selected home screen page after execution of the application, control the user interface to remove the mark displayed on the side of the icon.

7. The mobile device of claim 6, wherein the controller controls, from a time when the installation of the application is completed until a first time the application is executed, the user interface to display the mark on the side of the icon.

8. The mobile device of claim 6, wherein the controller controls, from a time when the installation of the application is completed until a first time the application is executed, the user interface to display the mark on the side of the icon as a flickering mark.

9. The mobile device of claim 6, wherein the controller controls, from a time when the installation of the application is completed until a first time the application is executed, the user interface to add a highlight the icon.

10. A non-transitory computer readable medium where a program to execute a method to install an application on a mobile device is stored, the method comprising:
  receiving an input to install an application;
  displaying a page selection screen to select one of a plurality of home screen pages;
  in response to receiving an input to select one of the plurality of home screen pages on the page selection screen, installing the application on the mobile device, and displaying an icon corresponding to the application and a graphic element for informing an installation progress of the application on the selected home screen page;
  in response to completing the installation of the application, removing the graphic element and displaying a mark on a side of the icon;
  in response to selecting the icon, executing the application and displaying an execution screen of the application; and
  in response to returning to the selected home screen page after execution of the application, removing the mark displayed on the side of the icon.

11. The non-transitory computer readable medium of claim 10, wherein displaying the mark comprises displaying from a time when the installation of the application is completed until a first time the application is executed, the mark on the side of the icon.

12. The non-transitory computer readable medium of claim 10, wherein displaying the mark comprises displaying, from a time when the installation of the application is completed until a first time the application is executed, the mark on the side of the icon as a flickering mark.

13. The non-transitory computer readable medium of claim 10, wherein displaying the mark comprises adding, from a time when the installation of the application is completed until a first time the application is executed, a highlight to the icon.

* * * * *